United States Patent [19]
Hara et al.

[11] Patent Number: 6,141,665
[45] Date of Patent: *Oct. 31, 2000

[54] MODEL-BASED JOB SUPPORTING SYSTEM AND METHOD THEREOF

[75] Inventors: Hirotaka Hara; Sanya Uehara; Takao Okubo; Nobuyuki Kanaya; Yuuji Hotta, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/800,380

[22] Filed: Feb. 14, 1997

[30] Foreign Application Priority Data

Jun. 28, 1996 [JP] Japan ................................. 8-168928

[51] Int. Cl.⁷ ............................. G06F 15/00; G06F 17/60
[52] U.S. Cl. ................................................. 707/500; 705/1
[58] Field of Search ..................................... 707/500–501, 707/1, 2–3, 8–9, 102, 200, 526, 516, 530, 531, 515; 345/326

[56] References Cited

U.S. PATENT DOCUMENTS

| | | | |
|---|---|---|---|
| 5,233,513 | 8/1993 | Doyle | 354/401 |
| 5,655,086 | 8/1997 | Jury et al. | 395/209 |
| 5,675,745 | 10/1997 | Oku et al. | 395/207 |

Primary Examiner—Joseph H. Feild
Assistant Examiner—Alford W. Kindred
Attorney, Agent, or Firm—Staas & Halsey LLP

[57] ABSTRACT

A job model with which an organization model representing an organization structure, a document model representing a document structure, and a work model representing a work procedure are correlated, is stored independent from a service model defining each service. When a service is performed, with reference to the job model corresponding to the service model, a service executing module causes a tool control module to control a tool. Thus, the required service is accomplished.

26 Claims, 21 Drawing Sheets

F I G. 7

| OBJECT NAME | OBJECT TYPE | DATE OF CREATION | DATE OF DELETION |
|---|---|---|---|
| SOFTWARE RESEARCH SECTION | SECTION | 19930401 | — |
| INFORMATION PROCESSING RESEARCH SECTION | SECTION | 19921001 | 19940401 |
| PRODUCT A DEVELOPMENT WORK | WORK | 19940401 | 19940401 |

101, 102

```
KNOWLEDGEBASE OBJECT
DocumentManager:
    ┌─────────────────────────┐
    │  EXPRESSION OF SERVICE  │
    └─────────────────────────┘

TaskManager:
    ┌─────────────────────────┐
    │  EXPRESSION OF SERVICE  │
    └─────────────────────────┘

ProjectManager:
    ┌─────────────────────────┐
    │  EXPRESSION OF SERVICE  │
    └─────────────────────────┘
```

F I G. 8

EXAMPLE OF SERVICE

> WHEN DOCUMENT WHOSE ATTRIBUTE IS DESIGNED IS ADDED, RELEVANT PERSONS SHOULD BE INFORMED OF ADDITION.

DESCRIPTION OF SERVICE

```
When if-add  -instance(X) & type(X)=DESIGN
then mail(X. assoc-person, MSGFILE);
```

EXAMPLE OF MESSAGE

> WORKER *YAMADA ICHIRO* HAS ADDED NEW DOCUMENT *PROGRAM SPECIFICATION* TO WORK *MULTIMEDIA PROGRAM DEVELOPMENT* TO WHICH YOU BELONG.

F I G. 9

EXAMPLE OF SERVICE

AFTER WORK WHOSE ATTRIBUTE IS CONFERENCE HAS BEEN COMPLETED, RELEVANT PERSONS SHOULD BE NOTIFIED OF IT ALONG WITH MINUTES OF PROCEEDINGS.

DESCRIPTION OF SERVICE

When If-finish-task-instance(X) & type(X) = MEETING
then mail(X.assoc-person, MSGFILE)

EXAMPLE OF MESSAGE

*MULTIMEDIA DEVELOPMENT CONFERENCE* WAS HELD AT *FIRST CONFERENCE* ROOM ON *MAY 15.* NEW DOCUMENT *MULTIMEDIA CONFERENCE PROCEEDINGS* WAS ADDED

F I G. 1 0

EXAMPLE OF SERVICE

> WHEN A NEW MEMBER IS ADDED, A LIST OF DOCUMENTS OF THE ORGANIZATION TO WHICH HE OR SHE BELONGS IS SENT TO HIM/HER.

DESCRIPTION OF SERVICE

```
When If-add-new-person(X)
then Group=X.belong-group, mail(X, MSGFILE)
```

EXAMPLE OF MESSAGE

> TO *YAMADA ICHIRO* :
> YOU WERE ADDED TO THE *MULTIMEDIA PROGRAM DEVELOPMENT GROUP.*
> THIS GROUP RELATES TO THE FOLLOWING DOCUMENTS:
> *PROGRAM SPECIFICATIONS,*
> *MULTIMEDIA SYSTEM DEVELOPMENT PLAN, AND*
> *MAY GROUP CONFERENCE PROCEEDINGS,*

FIG. 11

OBJECT TABLE

| OBJECT NAME | DATE OF CREATION |
|---|---|
| DEVELOPMENT WORK | APRIL |
| RESEARCH | APRIL |
| DEVELOPMENT | APRIL |
| INTEGRATED TEST | APRIL |

LINK TABLE

| LINK NAME | LINKED FROM | LINKED TO | DATE OF CREATION | DATE OF DELETION |
|---|---|---|---|---|
| consist-of | DEVELOPMENT WORK | RESEARCH | APRIL | — |
| consist-of | DEVELOPMENT WORK | DEVELOPMENT | APRIL | — |
| consist-of | DEVELOPMENT WORK | INTEGRATED TEST | APRIL | — |
| next-to | RESEARCH | DEVELOPMENT | APRIL | — |
| next-to | DEVELOPMENT | INTEGRATED TEST | APRIL | — |

F I G. 1 8

OBJECT TABLE

| OBJECT NAME | DATE OF CREATION |
|---|---|
| DEVELOPMENT WORK | APRIL |
| RESEARCH | APRIL |
| DEVELOPMENT | APRIL |
| INTEGRATED TEST | APRIL |
| EVALUATION | MAY |

LINK TABLE

| LINK NAME | LINKED FROM | LINKED TO | DATE OF CREATION | DATE OF DELETION |
|---|---|---|---|---|
| consist-of | DEVELOPMENT WORK | RESEARCH | APRIL | |
| consist-of | DEVELOPMENT WORK | DEVELOPMENT | APRIL | |
| consist-of | DEVELOPMENT WORK | INTEGRATED TEST | APRIL | |
| next-to | RESEARCH | DEVELOPMENT | APRIL | |
| next-to | DEVELOPMENT | INTEGRATED TEST | APRIL | MAY |
| consist-of | DEVELOPMENT WORK | EVALUATION | MAY | |
| next-to | RESEARCH | EVALUATION | MAY | |
| next-to | EVALUATION | DEVELOPMENT | MAY | |

F I G. 1 9

MODEL-BASED JOB SUPPORTING SYSTEM AND METHOD THEREOF

BACKGROUND OF THE INVENTION

1. Field of the Invention

The present invention relates to a job supporting system that contributes to improving the efficiency of jobs performed in companies and so forth, and a method thereof.

2. Description of the Related Art

In recent years, to improve the efficiency of job processing in companies, technologies called reengineering and concurrent engineering have been proposed. As computer systems that support such technologies and manage resources such as documents, application systems that include software tools such as document managing/sharing tools and work flow tools, have been actively developed. These systems are becoming a key for sharing information using electronic documents and improving the efficiency of work processing in organizations such as companies.

FIG. 1 shows the structure of a conventional job supporting system. In the system shown in FIG. 1, a user of the system inputs a service command for retrieving a document or the like to the system through a user interface 1. The service command is then sent to a service executing module 3 through a control module 2.

The content of the service to be provided to the user has been programmed in the service executing module 3. The service executing module 3 accesses a database management module 4 and executes the requested service. The database management module 4 has stored document information 5 that representing what kind of document formats and documents are in themselves.

When a user inputs a document retrieval command, the service executing module 3 retrieves the document information 5 from the database management module 4 and supplies the retrieved document to the user.

The conventional job supporting systems provide the following service tools:

(1) PCTE (Portable Common Tools Environment)

In PCTE, which that is an international standard of CASE (Computer Aided Software Engineering), a document repository mainly defining the relation of documents and tools that use the document repository has been considered.

(2) Groupware Tool

Groupware tools which are recently developed document managing/sharing tools, mainly provide a document sharing function for sharing documents among a plurality of users. For example, Lotus Notes, which is currently the most common groupware tool, is a document database that is fundamentally for electronic mail. In Lotus Notes, document types are defined with templates named forms. A document retrieval function in Lotus Notes is accomplished by sharing the forms with the users.

(3) Work Flow Tool

Work flow tools have been developed in recent years, as a tool for modeling works in organizations. In a work flow tool, the flow of a work is defined. Corresponding to the flow, commands are issued to workers.

However, the conventional job supporting systems have the following drawbacks.

As is known in BPR (Business Process Reengineering), in job proceeding steps, organizations, documents, and work procedures are frequently changed. In addition, as hardware and software technologies are continually advancing, services provided to users are also drastically changing. To deal with such drastic changes, not only the job supporting system, but the program of the service executing module 3 should be changed.

In the conventional database management module 4, only the document information 5 can be registered and referenced. Even if the document information 5 is changed, the contents of the services provided to users are not changed.

In addition, in the PCTE, the relation between the document repository and work definition is not considered. In the groupware tools, likewise, the relation between documents and works cannot be defined. In the groupware tools, although work commands can be issued through electronic mail, relevant programs should be created. On the other hand, in most work flow tools, a function for commanding works in a defined sequence is considered important. Thus, the relation between documents and organizations cannot be defined.

Consequently, in the conventional tools, with the functions that individual tools provide some company activities such as work flow can be supported, and information can be shared. However, all company activities cannot be supported. To deal with changes in supporting services, program codes should be changed. However, actually, such a method is very troublesome and impractical.

As a result, in the conventional job supporting systems, expansibility and flexibility for supporting all company activities are insufficient.

SUMMARY OF THE INVENTION

An object of the present invention is to provide a job supporting system that allows a relevant tool to be automatically activated and a relevant resource to be automatically used, so as to support all jobs of users and can be easily created/changed, and a method thereof.

A job supporting system according to the present invention comprises a job model storing unit, a service model storing unit, and a service unit.

The job model storing unit stores a job model. The job model represents a work of a user. The job model includes at least one of an organization model representing an organization structure, a document model representing a document structure, and a work model representing a work procedure. These organization model, document model, and work model are correlatively stored.

The service model storing unit stores a service model. The service model represents a service provided to the user of the system. With information extracted from the job model, the service model represents an available process presented to the user.

When the service unit receives a service request from the user of the system, the service unit references the job model and provides the user with a service corresponding to the service model.

According to the present invention, since the job model and the service model are independently stored, when an organization is changed, only the job model is changed. In contrast, when a service is changed, only the service model is changed. In addition, when an organization is changed, since each of the models of the job model are mutually correlated, they can be easily changed corresponding to the changed portion of the organization.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 7 is a schematic diagram showing an example of an object table;

FIG. 8 is a schematic diagram showing the structure of a service model;

FIG. 9 is a schematic diagram showing an example of a service of a DocumentManager;

FIG. 10 is a schematic diagram showing an example of a service of a TaskManager;

FIG. 11 is a schematic diagram showing an example of a service of a ProjectManager;

FIG. 18 is a schematic diagram showing a table corresponding to a work model before it is changed;

FIG. 19 is a schematic diagram showing a table corresponding to a work model after it is changed;

DESCRIPTION OF PREFERRED EMBODIMENT

Figure 1:
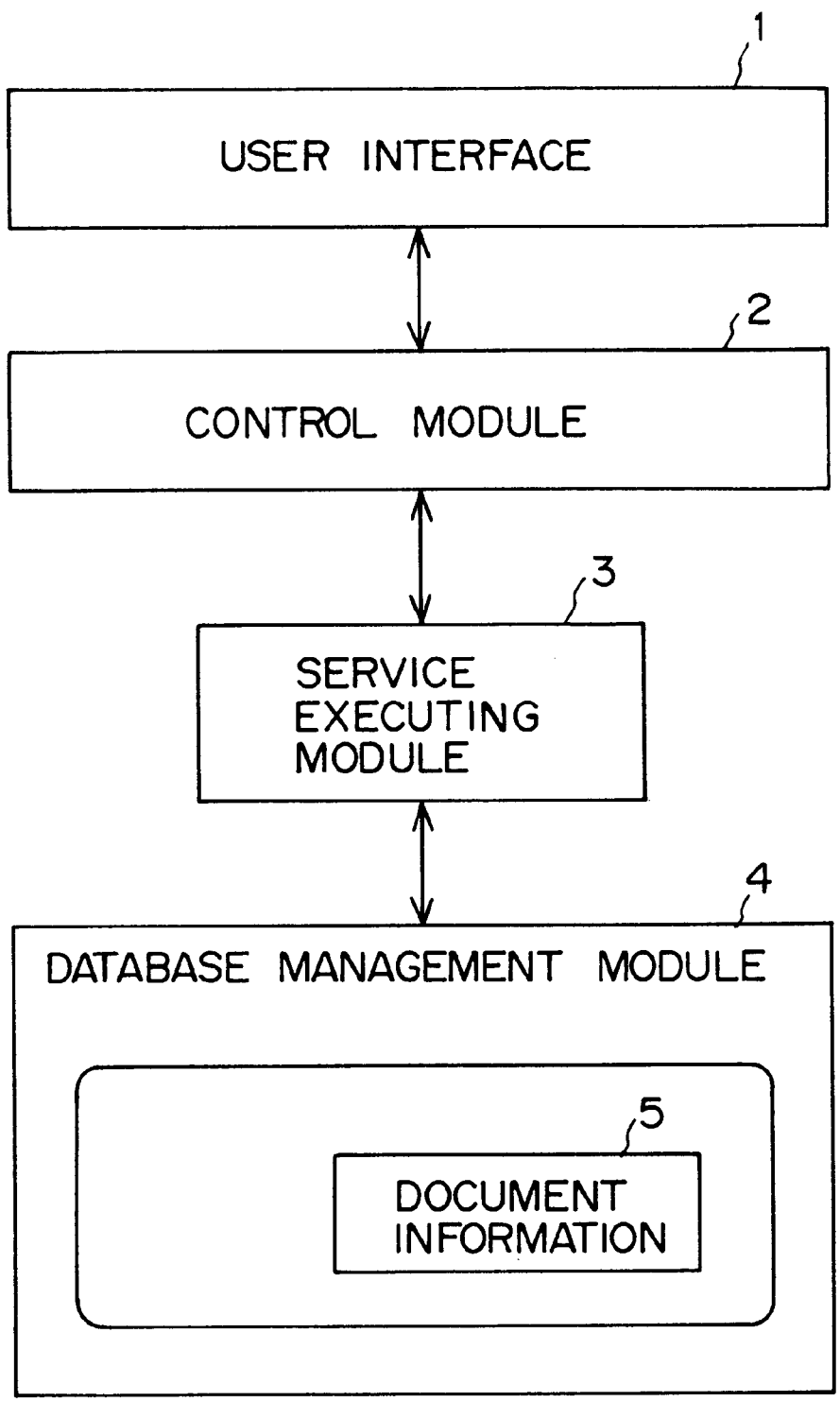
FIG. 1 is a schematic diagram showing a conventional job supporting system.
Figure 2:
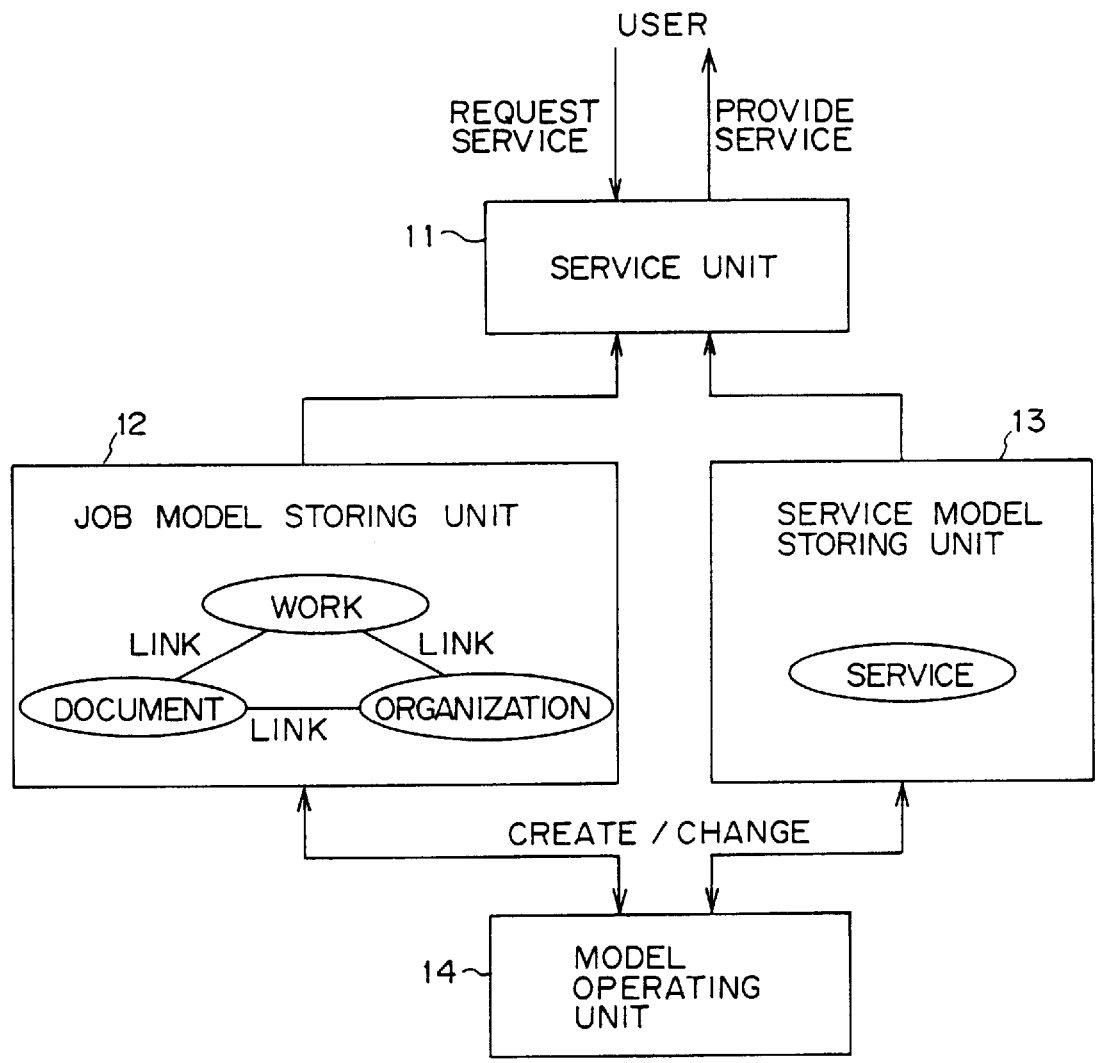
FIG. 2 is a schematic diagram showing the theory of a job supporting system according to the present invention.

FIG. 2 is a schematic diagram showing the theory of a job supporting system according to the present invention. The job supporting system shown in FIG. 2 comprises a service unit 11, a job model storing unit 12, a service model storing unit 13, and a model operating unit 14.

The job model storing unit 12 stores a job model that represents a work of a user. The service model storing unit 13 stores a service model that represents a service provided to the user.

When the service unit 11 receives a service request from the user of the system, the service unit 11 references the job model and provides a relevant service corresponding to the service model.

The job model represents information of an organization, a document, a work, and so forth corresponding to the job of the user, and a data structure that statically defines the relation thereof. The service model is a description that represents an available process provided to the user corresponding to information obtained from the work model. The content of the process in the service model is, for example, a process for informing an engineer who is accessing a document that it has been updated.

The service unit 11 retrieves a service model corresponding to a service request of the user, interprets it, references the job model, and executes the process corresponding to the service model. At this point, when necessary, the service unit 11 may evoke a software tool and use it.

According to such a structure, since the job model and the service model are independently defined, when the organization is changed, only the job model is changed, and when the service is changed, only the service model is changed. In addition, since these models are stored independently from the service unit 11 that executes the process, data of changed portion only can be easily rewritten. Thus, it is not necessary to change the service unit 11.

Consequently, the work model and the service model can be easily expanded and changed. Thus, since the service unit and the software tool can be generally used, the flexibility of the entire system is improved. As a result, an application system that can handle various services can be structured.

The job model storing unit 12 stores a job model composed of an organization model that represents an organization structure, a document model that represents a document structure, and a work model that represents a work procedure.

The organization model, document model, and work model are correlated with each other by relevant links or the like in the job model storing unit 12. The service unit 11 retrieves necessary information corresponding to the relation of these models and provides a service to the user corresponding to the information.

When specifications are updated, the service unit 11 retrieves a work correlated with the specification, and an engineer correlated with the work, and sends electronic mail or the like that represents that the specifications have been updated to the engineer (or engineers) correlated with the work.

The model operating unit 14 can create and change the job model and the service model.

In the conventional job supporting system, when information of an organization or the like is changed, the operation of the system should be temporarily stopped and the relevant program should be rewritten. However, when the system shown in FIG. 2 is operated, the relevant portion of the model can be changed through the model operating unit 14 at any time. Thus, the job can be changed daily. Consequently, the user can operate the system with a precondition that the job is changed.

Figure 3:
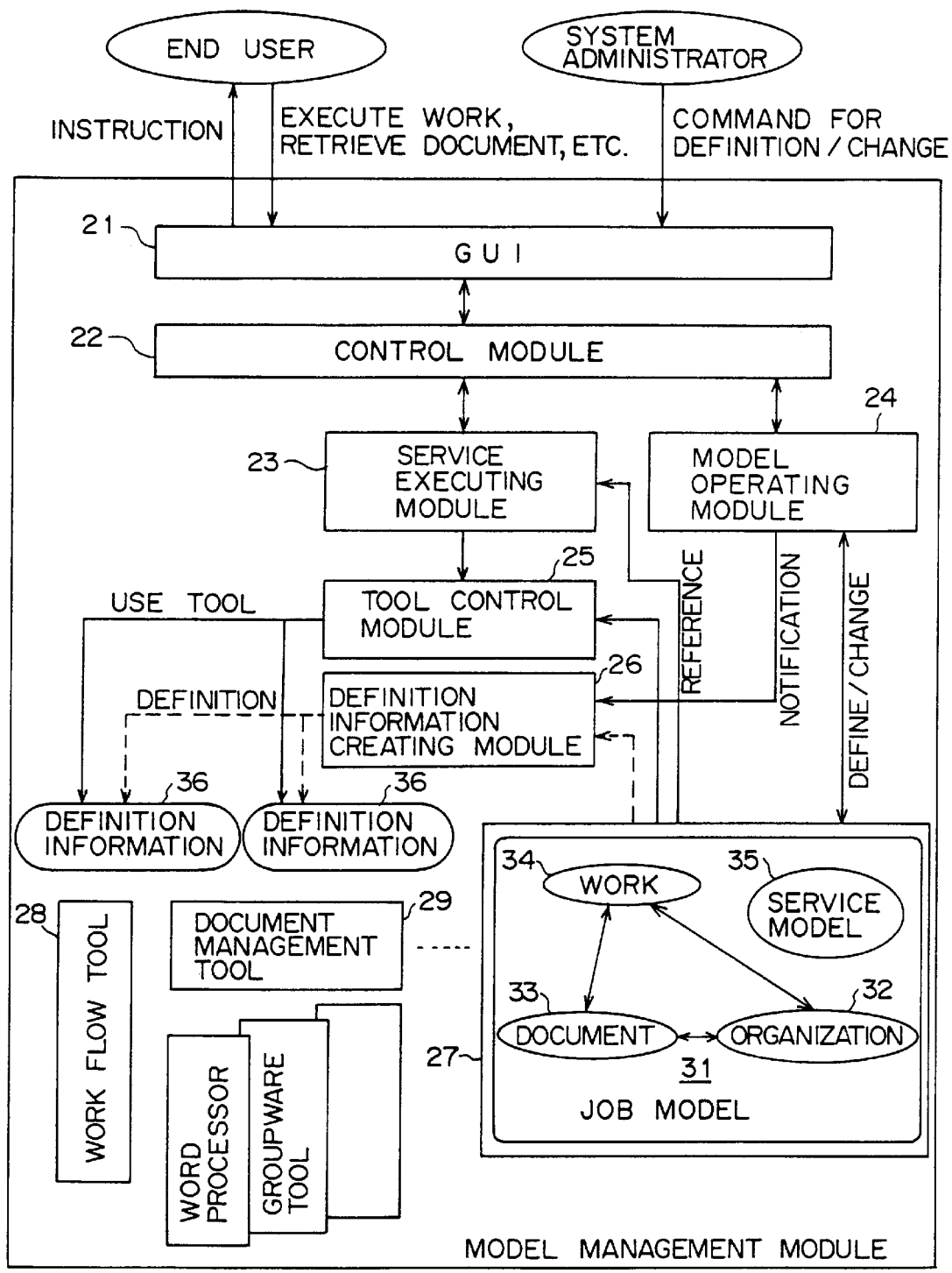
FIG. 3 is a schematic diagram showing the structure of the job supporting system.

The service unit 11 shown in FIG. 2 corresponds to a service executing module 23, a tool control module 25, and a definition information creating module 26 shown in FIG. 3. The job model storing unit 12 and the service model storing unit 13 correspond to a model management module 27. The model operating unit 14 corresponds to a model operating module 24.

Next, with reference to the accompanying drawings, an embodiment of the present invention will be described in detail.

According to the present invention, an organization structure, a document structure, and a work structure that may be changed, are defined as models for a job that are independent from software tools. Thus, the job form can be easily extended and changed.

In addition, the supporting service is also independently modeled so that an application system in which software tools such as a document managing/sharing tool and a work flow tool can be used integratively is structured. Since services are provided as models rather than programs, they can be easily created, deleted, and changed.

FIG. 3 is a schematic diagram showing the structure of a job supporting system according to an embodiment of the present invention. The job supporting system shown in FIG. 3 has various software tools such as a graphical user interface (GUI) 21, a control module 22, a service executing module 23, a model operating module 24, a tool control module 25, a definition information creating module 26, a model management module 27, a work flow tool 28, a document management tool 29, and so forth.

The document management tool 29 includes, for example, a wordprocessor and a groupware tool.

A job model 31 that the model management module 27 manages is how the contents of jobs of an organization of a company or the like are modeled. The job model 31 consists of an organization model 32, a document model 33, and a work model 34. A service model 35 is a model by which a service necessary for improving the efficiency of a job is defined with the job model 31.

In the conventional system, a document is referenced as a database. On the other hand, in the system according to the present invention, a document can be correlated with an organization and a work. A service is accomplished corresponding to this relation. The job model 31 and the service model 35 may have been defined by the system administrator or the like before the system is operated. While the system is being operated, the job model 31 and the service model 35 can be changed at any time.

The GUI 21 is an interface provided to the end users or the system administrator. An end user can input a service request on the screen through the GUI 21 so as to start a work or retrieve a document. The system sends a relevant instruction to the user through the GUI 21. Although the system administrator can define and change a model through the GUI 21, he or she may directly send a command to the control module 22 without using the GUI 21.

The control module 22 controls the service executing module 23 and the model operating module 24 corresponding to a service request from an end user or a command issued by the system administrator.

With reference to the job model 31 and the service model 35 in the model management module 27, the service executing module 23 accomplishes the requested service. At this point, when necessary, the service executing module 23 requests the tool control module 25 to perform a process. The model operating module 24 newly defines or changes the job model 31 and the service model 35, and notifies the definition information creating module 26 that these models have been newly defined or changed.

The definition information creating module 26 references the job model 31 and the service model 35 corresponding to the notification supplied from the model operating module 24 and creates the definition information 36 necessary for each tool. The definition information 36 is a command or the like corresponding to a tool. Thus, the definition or change of an organization, a document, a work, or the like affects the operational environment of a tool corresponding thereto.

The tool control module 25 receives information necessary for using each tool from the service executing module 23, automatically activates the necessary tool with the definition information 36, and controls the tool. Alternatively, when necessary, the tool control module 25 can reference the job model 31 and the service model 35. Thus, the tool necessary for executing the service requested by the user is automatically activated.

In such a structure, the end user can request services for starting a work and retrieving a document without a need to consider the use of particular tools. The required tool is automatically provided.

In the system shown in FIG. 3, various services written as programs of the service executing module 3 are accomplished corresponding to the service model 35 defined in the model management module 27. The service model 35 can be changed along with the job model 31 at any time. The change of the service model 35 automatically affects the content of the service. Hereinafter, the end users and system administrator are simply referred to as a user.

Figure 4:
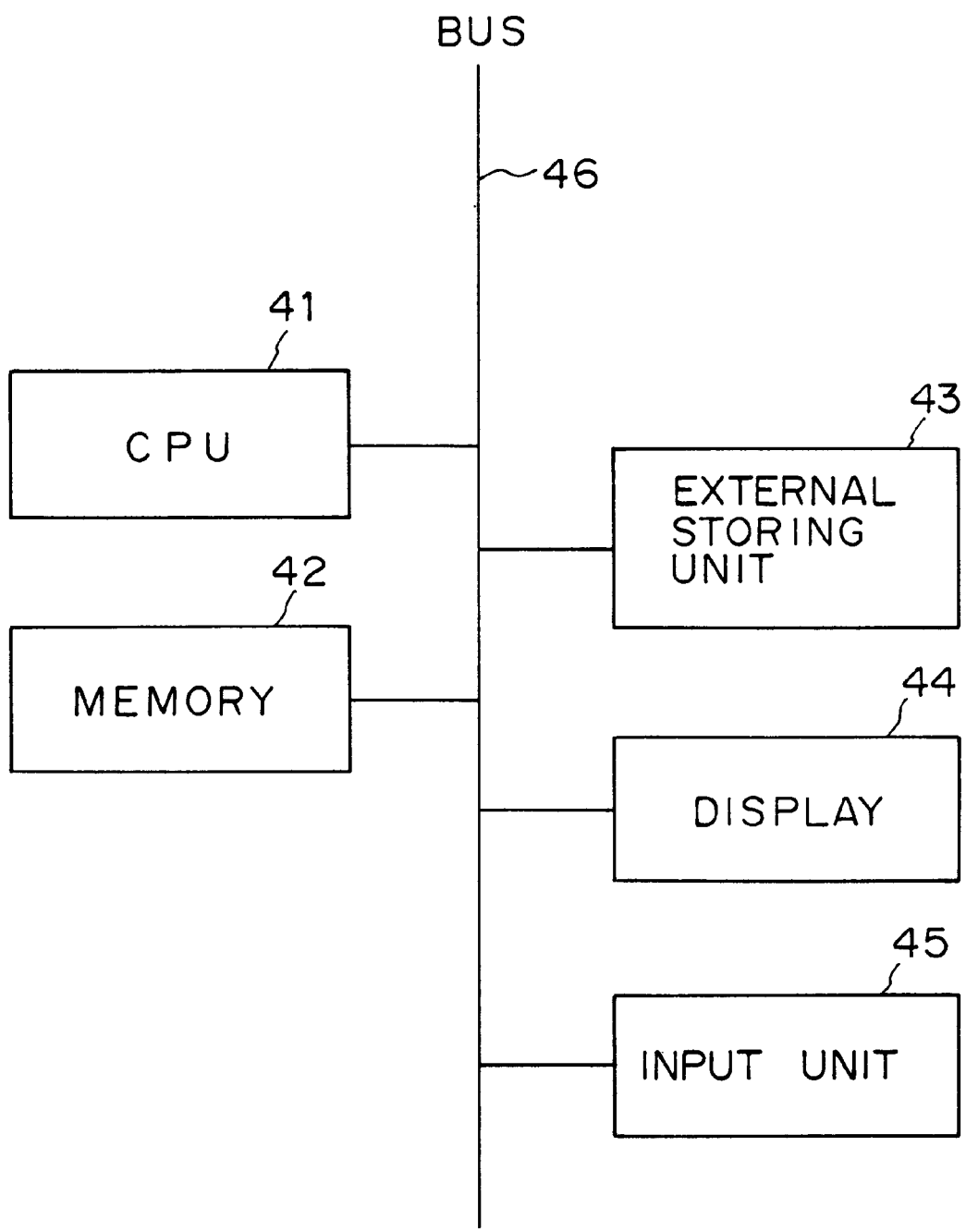
FIG. 4 is a schematic diagram showing the structure of an information processing system.

FIG. 4 is a schematic diagram showing the structure of an information processing system that accomplishes the job supporting system shown in FIG. 3. The information processing apparatus shown in FIG. 4 comprises a CPU (Central Processing Unit) 41, a memory 42, an external storing unit 43, a display 44, and an input unit 45. These units are connected through a bus 46.

The external storing unit 43 is, for example, a magnetic disk unit, an optical disk unit, or a magneto-optic disk unit. The external storing unit 43 is used as a database of the model management module 27, which stores the job model 31 and the service model 35.

The CPU 41 executes a program stored in the memory 42 and accomplishes processes of the GUI 21, the control module 22, the service executing module 23, the model operation model 24, the tool control module 25, the definition information creating module 26, the various software tools, and so forth.

The input unit 45 includes, for example, a keyboard and a pointing device or the like. With the input unit 45, the user inputs a command. The display 44 displays a system message, a visualized model, and so forth.

Next, with reference to FIGS. 5 to 11, examples of the structures of the job model 31 and the service model 35 that are composed of objects will be described. An object represents a data structure composed of data and a procedure corresponding thereto.

Figure 5:
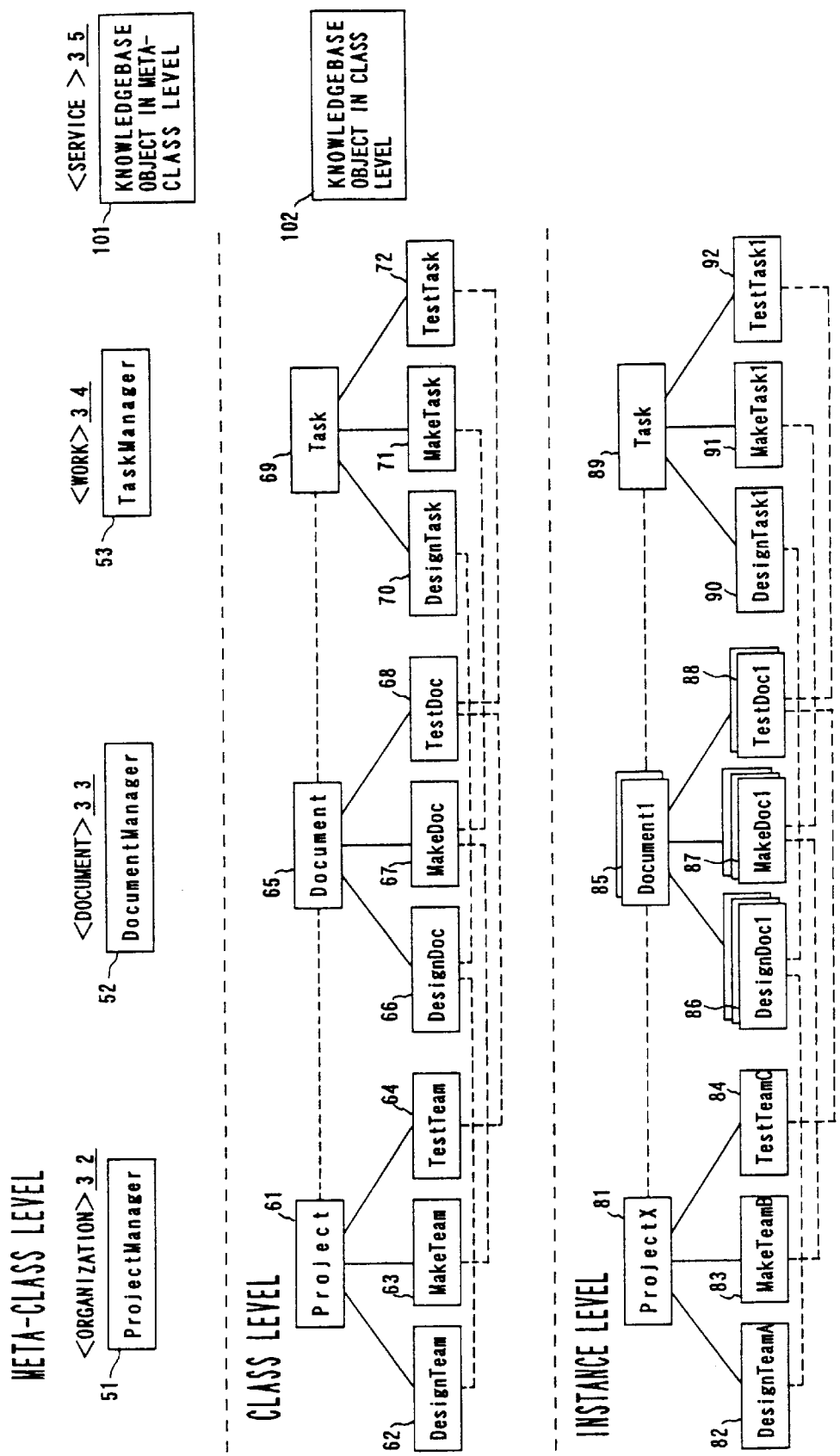
FIG. 5 is a schematic diagram showing the structure of each model.

FIG. 5 shows examples of the data structures of the job model 31 and the service model 35. In the organization model 32, the document model 33, and the work model 34, objects in a class level define object structures in an instance level. Objects in the instance level represent real models.

A ProjectManager object 51, a DocumentManager object 52, and a TaskManager object 53 in the meta-class level manage user's definitions of organization, document, and work models in the class level.

For example, when the user commands the system to model that a Project object 61 consists of a DesignTeam object 62, a MakeTeam object 63, and a TestTeam object 64, the ProjectManager object 51 in the meta-class level links the Project object 61 with the objects 62, 63, and 64, as denoted by solid lines in FIG. 5.

The DesignTeam object 62 represents a design section. The MakeTeam object 63 represents a production section. The TestTeam object 64 represents a test section.

Likewise, the DocumentManager object 52 links the Document object 65 with a DesignDoc object 66, a MakeDoc object 67, and a TestDoc object 68. The TaskManager object 53 links a Task object 69 with a DesignTask object 70, a MakeTask object 71, and a TestTask object 72.

The DesignDoc object 66, the MakeDoc object 67, and the TestDoc object 68 represent a design document, a production management document, and a test management document, respectively. The DesignTask object 70, the MakeTask object 71, and the TestTask object 72 represent a design step, a production step, and a test step, respectively.

In addition, as denoted by dotted lines, the reference relation between the organization model 32 and the document model 33 and the reference relation between the document model 33 and the work model 34 are set.

In this example, the Project object 61 and the Document object 65 are correlated. The Document object 65 and the Task object 69 are correlated.

Likewise, the DesignTeam object 62, the MakeTeam object 63, and the TestTeam object 64 are correlated with the DesignDoc object 66, the MakeDoc object 67, and the TestDoc object 68, respectively. The DesignDoc object 66, the MakeDoc object 67, and the TestDoc object 68 are correlated with the DesignTask object 70, the MakeTask object 71, and the TestTask object 72, respectively.

In addition, these objects in the meta-class level manage objects in the class level to create object in the instance level. An object in the instance level is created corresponding to the structure in the class level and the relation with the relevant object in the class level is maintained.

For example, a ProjectX object 81 is correlated with a DesignTeamA object 82, a MakeTeamB object 83, and a TestTeamB object 84 by the link, in the same that the Project object 61 corresponding to the ProjectX object 81 in the class level is correlated with the DesignTeam object 62, the MakeTeam object 63, by the link, and the TestTeam object 64, corresponding to the DesignTeamA object 82 and the MakeTeamB object 83 in the class level.

In addition, the ProjectX object 81, the DesignTeamA object 82, the MakeTeamB object 83, and the TestTeamB object 84 are correlated with the Project object 61, the DesignTeam object 62, the MakeTeam object 63, and the TestTeam object 64, respectively.

A Document1 object 85, a DesignDoc1 object 86, a MakeDoc1 object 87, a TestDoc1 object 88, a Task object 89, a DesignTask1 object 90, a MakeTask1 object 91, and a TestTask1 object 92 in the instant level of another model are created in the same manner as above. These objects are correlated with relevant objects in the class level.

In addition, the reference relation between different models in the instance level are set in the same manner as the class level as denoted by dotted lines. For example, the DesignTeamA object 82 is correlated with the DesignDoc1 object 86. The DesignDoc1 object 86 is correlated with the DesignTask1 object 90.

However, it is not necessary to correlate objects at the same time. Thus, at a particular point, there may not be correlated objects between the organization model 32 and the document model 33 or between the document model 33 and the work model 34.

In this example, objects in the meta-class of the organization model 32, the document model 33, and the work model 34 are created as dynamic objects that define objects in the class level and that generate objects in the instance level using objects in the class level. In addition, objects in the class level and the instance level are created as static objects that have only attribute data.

On the other hand, the service model 35 is described with a form of a rule. Unlike with each object of the job model 31, the service model 35 is managed as a knowledgebase object.

In FIG. 5, the service model 35 is present in each of the meta-class level and the class level. In a knowledgebase object 101 in the meta-class level, a service that references objects in the meta-class level and the instance level is described. And in a knowledgebase object 102 in the class level, a service that references an object in the class level is described.

Figure 6:
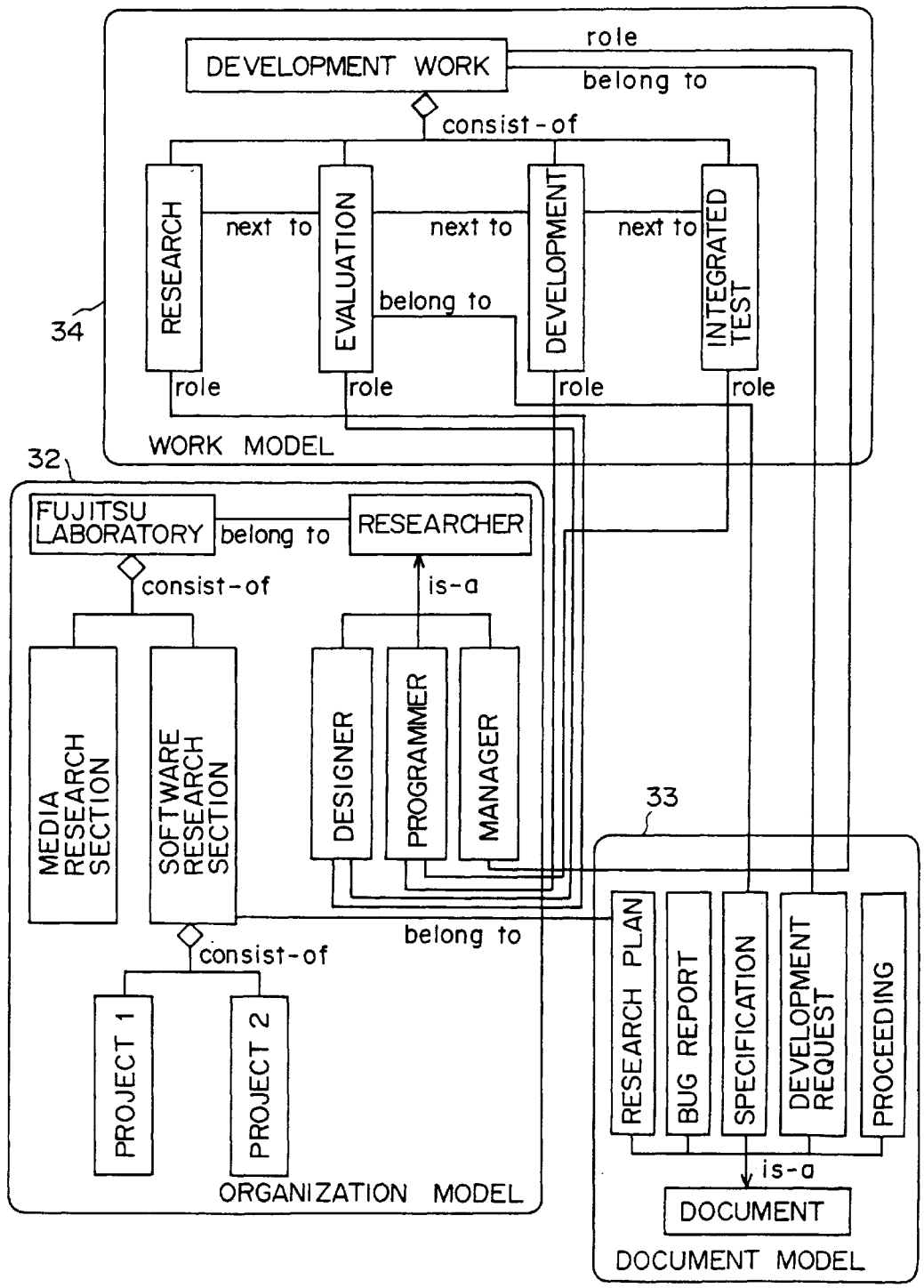
FIG. 6 is a schematic diagram showing a display screen of a work model.

FIG. 6 shows an example of a job model 31 of a company displayed on the screen. The job model 31 shown in FIG. 6 represents a model in the class level. In FIG. 6, each rectangle such as "DEVELOPMENT WORK" corresponds to one object.

As an example of the work model 34, a work "DEVELOPMENT WORK" has been defined. The "DEVELOPMENT WORK" consists of four sub-works such as "RESEARCH", "EVALUATION", "DEVELOPMENT", and "INTEGRATED TEST" that are represented as a link "consist-of". The execution of these sub-works is represented as a link "next to".

In a document model 33, five documents that are "RESEARCH PLAN", "BUG REPORT", "SPECIFICATION", "DEVELOPMENT REQUEST", and "PROCEEDING" have been defined. These documents are correlated with "DOCUMENT" by a link "is-a".

In an organization model 32, a link "consist-of" represents that an organization "FUJITSU LABORATORY" consists of "SOFTWARE RESEARCH SECTION" and "MEDIA RESEARCH SECTION". Actually, although "FUJITSU LABORATORY" consists of more organizations, most of them are omitted. Likewise, "SOFTWARE RESEARCH SECTION" consists of two organization objects "PROJECT 1" and "PROJECT 2".

People who belong to "FUJITSU LABORATORY" are "RESEARCHER"s. The "RESEARCHER"s are categorized as "DESIGNER"s, "PROGRAMMER"s, and "MANAGER"s corresponding to their job assignments. "FUJITSU LABORATORY" and "RESEARCHER"s are correlated by a link "belong to". "RESEARCHER"s, "DESIGNER"s, "PROGRAMMER"s, and "MANAGER"s are correlated by a link "is-a".

In addition, the correlation among these three models has been defined. First, documents necessary for individual works are defined for the work model 34. For example, when the "DEVELOPMENT WORK" is performed, the "DEVELOPMENT REQUEST" is required. The "DEVELOPMENT WORK" and the "DEVELOPMENT REQUEST" are correlated by a link "belong to". Likewise, the sub-work "EVALUATION" is correlated with the "SPECIFICATION" by a link "belong to".

People with roles for executing individual sub-works are represented by a link "role". For example, the "MANAGER" orders the "DEVELOPMENT WORK". The "DESIGNER" performs "RESEARCH" and "EVALUATION". The "PROGRAMMER" performs "DEVELOPMENT" and "INTEGRATED TEST".

In addition, documents necessary for individual organizations and people are defined by a link "belong to". For example, the "SOFTWARE RESEARCH SECTION" is correlated with the document "RESEARCH PLAN".

Since the contents of models are represented with graphics, the models can be easily edited. Models are graphically edited by a conventional CASE tool or a conventional CAD (Computer Aided Design) tool. Thus, a complicated relation among objects can be easily defined or changed.

The contents of individual models shown in FIG. 5 increase as objects in the instance level and objects in the class level are appended. When the contents of these models are stored in a table structure such as a database, the user can know a particular organization, document, and work progress, etc., at any past point.

In this example, the model operating module 24 creates an object table that represents the contents of a model in the model management module 27. When a model is defined or changed, the relevant object name and the date of creation or the date of deletion are recorded in the object table. When the user inputs an inquiry to the system, the service executing module 23 references the model management module 27 and displays the contents of the object table on the display 44.

FIG. 7 shows an example of the object table displayed on the display 44. The object table shown in FIG. 7 includes an "OBJECT NAME" field, an "OBJECT TYPE" field, a "DATE OF CREATION" field, and a "DATE OF DELETION" field.

For example, the type of the object "SOFTWARE RESEARCH SECTION" of the organization model 32 is "SECTION" that was created on Apr. 1, 1993. "−" in the "DATE OF DELETION" field represents that the "SOFTWARE RESEARCH SECTION" has not been deleted. The type of the object "PRODUCT A DEVELOPMENT WORK" of the work model 34 is "WORK". The "PRODUCT A DEVELOPMENT WORK" was created on Apr. 1, 1994 and deleted on the same day.

In addition to the object table, the model operating module 24 creates a link table that tabulates the date of creation of each link (which represents the relation among individual objects) and so forth. The link table is stored in the model management module 27. Thus, the user can know the reference relation and so forth of a particular object at any past point. An example of the link table will be described later.

FIG. 8 shows an example of the structure of each of the knowledgebase object 101 in the meta-class level and the knowledgebase object 102 in the class level, of which the service model 35 consists. In FIG. 8, expressions of services corresponding to the DocumentManager object 52, the TaskManager object 53, and the ProjectManager object 51 are stored. Next, with reference to FIGS. 9 to 11, examples of the expressions of the individual services will be described.

FIG. 9 shows an example of a service that is executed corresponding to the DocumentManager object 52. The content of the service is "WHEN A DOCUMENT IN THE INSTANCE LEVEL AND WHOSE ATTRIBUTE IS 'DESIGN' IS APPENDED, ELECTRONIC MAIL WITH A FILE 'MSGFILE' IS SENT TO A PERSON CORRELATED WITH THE DOCUMENT".

The expression of the service is, for example, "When If-add-instance (X) & type (X)=DESIGN then mail (X.assoc-person, MSGFILE);". With this expression, when the service is executed, a message shown at the lowest portion of FIG. 9 is sent to the relevant person.

In this example, phrases written in italics and in a bold font are embedded in a fixed message of the MSGFILE. The "PROGRAM SPECIFICATION" represents an appended document name. "YAMADA ICHIRO" represents the name of the person who created the document. "MULTIMEDIA PROGRAM DEVELOPMENT" represents the name of the work to which the document belongs. Thus, the recipient of the message can know the presence of the "PROGRAM SPECIFICATION" and immediately use it for his or her work.

When the expression of this service is defined by the model operating module 24, the expression is translated into a format that the DocumentManager object 52 can interpret and the result is stored in the model management module 27.

When the DocumentManager object 52 creates an instance of the document model 33 corresponding to a command supplied from the model operating module 24, the instance of the document model 33 is automatically hooked and executed by the service executing module 23. A "hook" means that the condition in the service is satisfied.

FIG. 10 shows an example of a service that is executed corresponding to the TaskManager 53. The content is "WHEN A WORK WHOSE ATTRIBUTE IS 'MEETING' IS COMPLETED, ELECTRONIC MAIL WITH A FILE 'MSGFILE' ATTACHING PROCEEDINGS IS SENT TO A RELEVANT PERSON".

The expression of the relevant service is, for example, "When If-finish-task-instance (X) & type (X)=MEETING then mail (X.assoc-person, MSGFILE);". With this expression, when the service is executed, a message as phrased at the lowest portion of FIG. 10 is sent to a relevant person.

In this example, phrases written in italics and in a bold font are embedded in a fixed message of the MSGFILE. "MULTIMEDIA DEVELOPMENT CONFERENCE" represents the name of a work that has been completed. "MAY 15" represents the data of the conference held. "FIRST CONFERENCE ROOM" represents the place of the conference held. "MULTIMEDIA CONFERENCE PROCEEDINGS" represents the name of the proceedings of the conference. Thus, the recipient of the message can know the presence of the "MULTIMEDIA CONFERENCE PROCEEDINGS" and immediately use it.

When the expression of this service is defined by the model operating module 24, the expression is translated into a format that the Model Manager object 53 can interpret and the result is stored in the model management module 27. When information that represents that the conference defined in the work model 33 has been completed is input, it is automatically hooked and executed by the service executing module 23.

FIG. 11 shows an example of a service executed corresponding to the ProjectManager object 51. The content of the service is "WHEN A NEW MEMBER IS APPENDED, ELECTRONIC MAIL WITH A FILE 'MSGFILE' ATTACHING A LIST OF DOCUMENTS OF THE ORGANIZATION TO WHICH HE OR SHE BELONGS IS SENT TO HIM OR HER".

The expression of the service is, for example, "When If-add-new-person (x) then Group=X. belong-group, mail (X, MEGFILE);". With this expression, a message represented at the lowest portion of FIG. 11 is sent to the new member.

In this example, phrases written in italics and in a bold font are embedded in a fixed message of the MSGFILE. "YAMADA ICHIRO" represents the name of a new member. "MULTIMEDIA PROGRAM DEVELOPMENT" represents the name of an organization to which the new member belongs. "PROGRAM SPECIFICATIONS", "MULTIMEDIA SYSTEM DEVELOPMENT PLAN", and "MAY GROUP CONFERENCE PROCEEDINGS" represent a list of documents correlated with the group. The recipient of the message, "YAMADA ICHIRO", can access these documents and know the organization to which he belongs and the outline of the job assigned to him.

When the expression of this service is defined by the model operating module 24, the expression is translated into a format that the ProjectManager object 51 can interpret and the result is stored in the model management module 27. When the ProjectManager object 51 creates an instance of a member of the organization model 32 corresponding to a command supplied from the model operating module 24, it is automatically hooked and executed by the service executing module 23.

Thus, a service corresponding to the service model 35 is automatically executed with reference to the job model 31 and provided to the user.

The example of the service of the DocumentManager object 52 shown in FIG. 9 and the example of the service of the ProjectManager object 51 shown in FIG. 11 are services that are activated when an instance is newly created. Thus, these services are stored in the knowledgebase 101 in the meta-class, which creates an instance.

On the other hand, the example of the service of the TaskManager object 53 shown in FIG. 10 is a service common with instances in the class level, the service is stored in the knowledgebase 102 in the class level.

As shown in FIGS. 9 and 10, with the job model 31, when a document is created or updated, a relevant person is automatically notified of it. Such a notification service is hereinafter referred to as correlative notification.

For example, in the job model 31 shown in FIG. 6, when a person who is performing the "INTEGRATED TEST" updates the "DEVELOPMENT REQUEST" corresponding to a test result, people correlated with the job model 31 are listed up and they are notified that the "DEVELOPMENT REQUEST" has been updated.

In reality, the "DEVELOPMENT WORK" correlated with the "DEVELOPMENT REQUEST" by a link "belong" is retrieved and thereby the sub-works "RESEARCH", "EVALUATION", "DEVELOPMENT", and "INTEGRATED TEST" correlated with the "DEVELOPMENT WORK" by a link "consist-of" are obtained. Thereafter, the role names "DESIGNER", "PROGRAMMER", and "MANAGER" that are correlated with each sub-works and the "DEVELOPMENT WORK" by a link "role" are retrieved.

People that are instances corresponding to these roles are automatically notified of the update of the "DEVELOPMENT REQUEST" by electronic mail or the like. Thus, the correlation notification is performed to all people correlated with the "DEVELOPMENT REQUEST".

An example of the service of the correlation notification is as follows.

Service 1

If a document "Product" is updated, a "Work" correlated with "Product"by a link "belongs " is retrieved. Thereafter, "Subworks" correlated with all "Work"s by a link "consist-of" are retrieved. Next, "Person" correlated with all "Subwork"s by a link "role" are retrieved. All "Person"s are notified that the "Product" has been updated.

With such a correlative notification, information of documents that have been created/updated can be immediately shared with correlated people. Since these people can always work with the latest information, the work efficiency can be improved.

In addition, with the job model 31, when a particular work is started, a person who is accessing a document that may be updated in future can be notified of the update of the document. This service is referred to as in-advance notification.

For example, assume that a "SPECIFICATION" is created for a sub-work "EVALUATION" of a work "DEVELOPMENT WORK" of a particular system, and a subwork "DEVELOPMENT" is performed corresponding to the "SPECIFICATION". And a new work "DEVELOPMENT WORK" corresponding to the same system is starting. At this point, although the "SPECIFICATION" has not been changed, when the new work proceeds, the "SPECIFICATION" will be changed in the sub-work "EVALUATION".

In this case, since the current sub-work "DEVELOPMENT" may be useless, the people who are in charge of the sub-work "DEVELOPMENT" are notified of the possibility of the change of the "SPECIFICATION".

With such an in-advance notification, before a document is changed, relevant people can know of the possibility of the change. Thus, the relevant people can take countermeasures such as a schedule change. Consequently, this service remarkably contributes to improving the efficiency of the job.

Next, with reference to FIGS. 12 to 15, the flows of the processes of the service executing module 23, the model operating module 24, the tool control module 25, and the definition information creating module 26 will be described.

Figure 12:
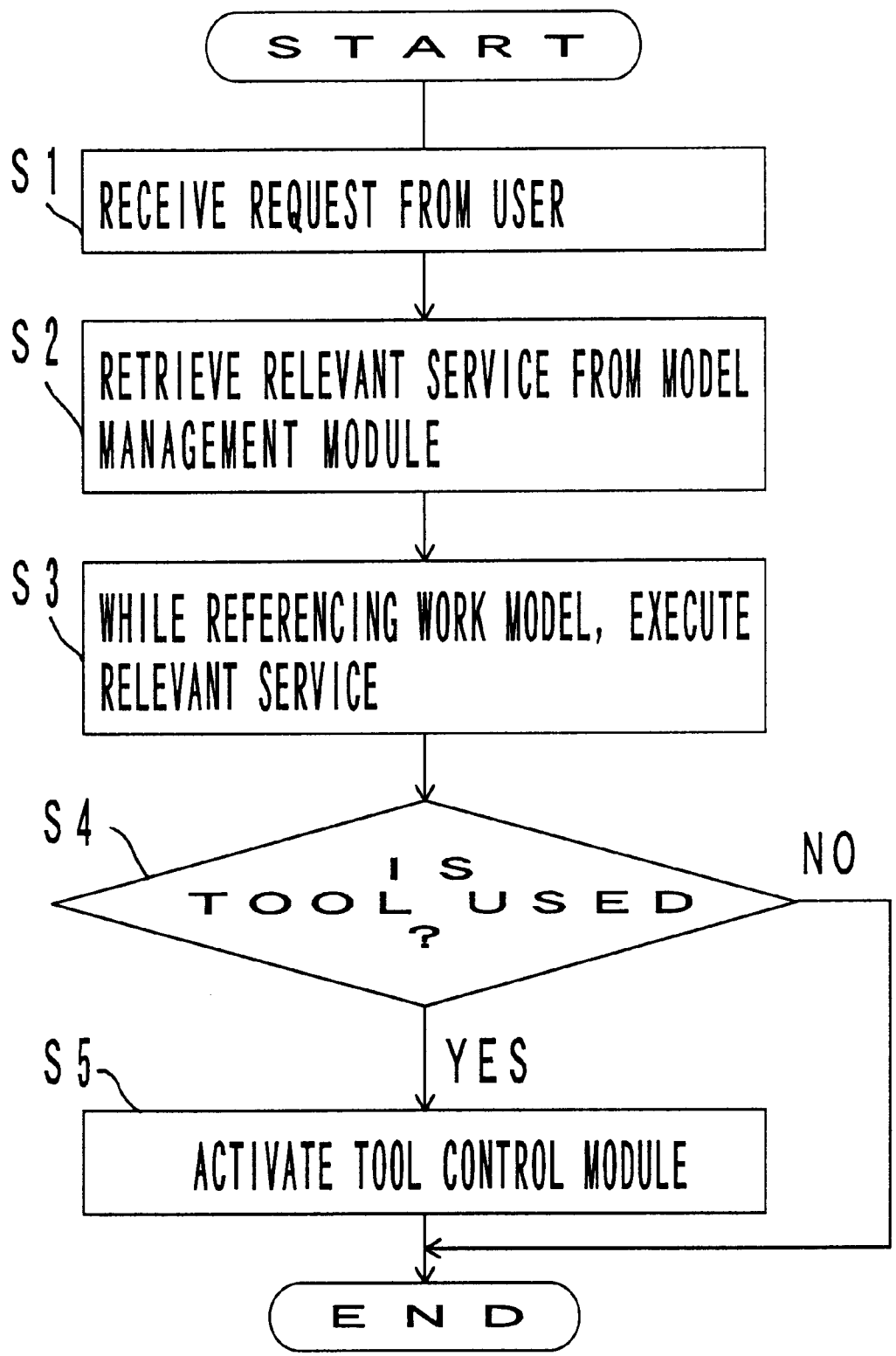
FIG. 12 is a flow chart showing the process of a service executing module.

FIG. 12 is a flow chart of the process of the service executing module 23 in the case that it has received a service request from the user. When the process is started in FIG. 12, the service executing module 23 receives the service request from the control module 22 (at step S1). Next, the service executing module 23 retrieves a service model 35 corresponding to the request from the model management module 27 (at step S2). When necessary, with reference to the job model 31, the service executing module 23 executes the service (at step S3).

At this point, the service executing module 23 determines whether or not it is necessary to use a software tool (at step S4). When the determined result is No (namely, a software tool is not used), the process of the service executing module 23 is completed. When the determined result is YES (namely, any tool is used), the service executing module 23 activates the tool control module 25 and requests it to control the tool (at step S5). Thereafter, the process of the service executing module 23 is completed.

Figure 13:
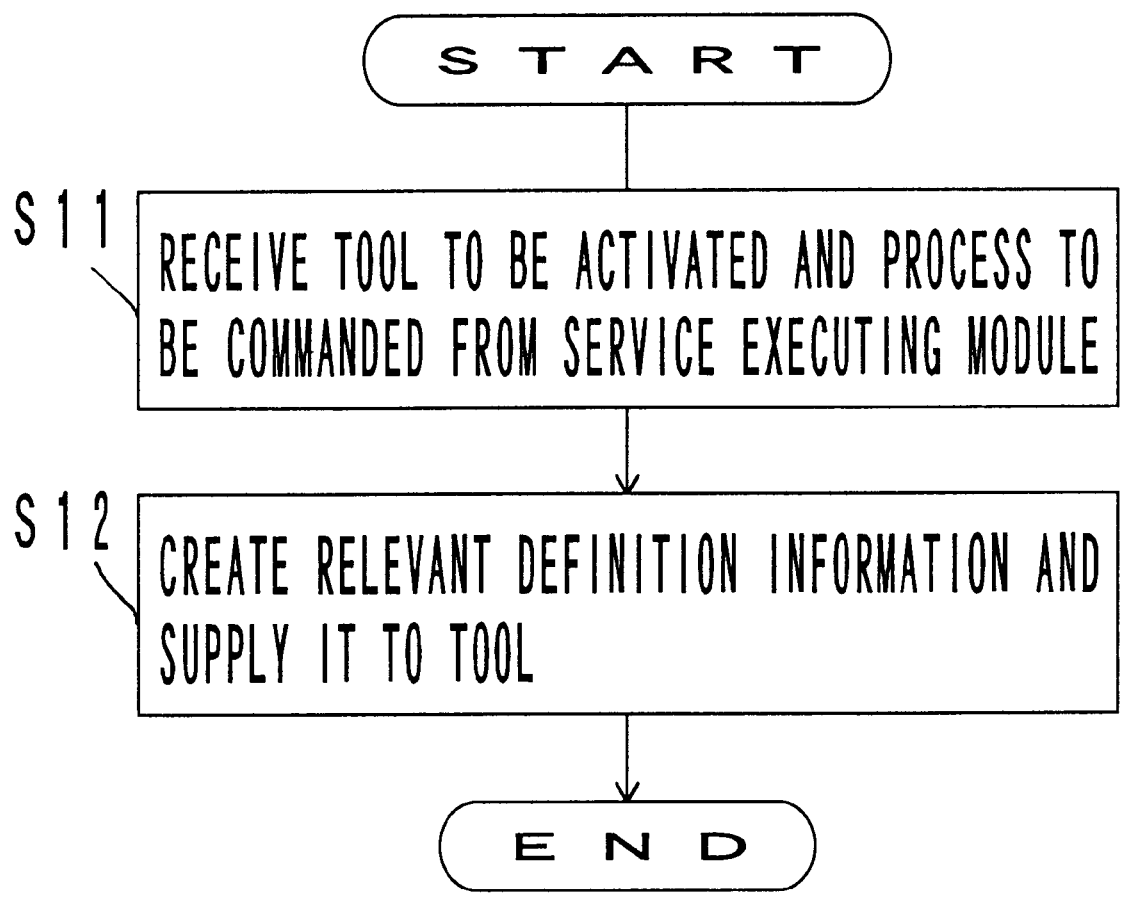
FIG. 13 is a flow chart showing the process of a tool control module.

FIG. 13 is the flow chart of the process of the tool control module 25 in the case that it is activated by the service executing module 23. When the process is started in FIG. 13, the tool control module 25 receives a tool to be activated and the content of the process to be commanded to the tool from the service executing module 23 (at step Sl). Next, the tool control module 25 creates definition information 36 corresponding to the tool (at step S12) and supplies it to the tool. Thus, the process of the tool control module 25 is completed.

Figure 14:
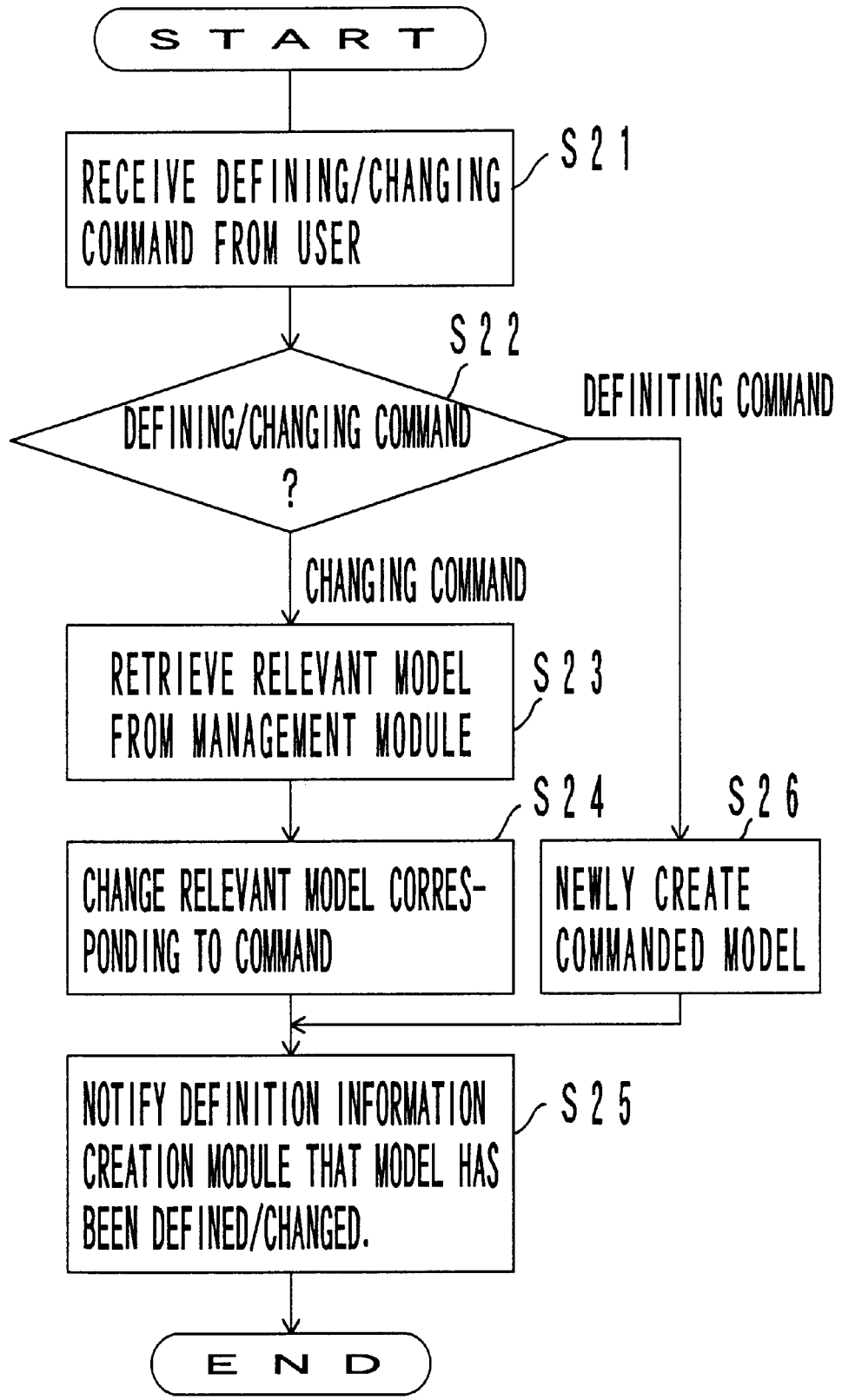
FIG. 14 is a flow chart showing the process of a model operation module.

FIG. 14 is a flow chart of the process of the model operating module 24. When the process of the model operating module 24 is started in FIG. 14, it receives a command for defining/changing a model that has been input by the user from the control module 22 (at step S21) and determines whether the received command is a model defining command or a model changing command (at step S22).

When the received command is the model changing command, the model operating module 24 retrieves a relevant model from the model management module 27 (at step S23), changes the model corresponding to the command (at step S24), and notifies the definition information creating module 26 that the model has been changed (at step S25). Thus, the process of the model operating module 24 is completed.

When the received command is the model defining command, the model operating module 24 newly creates a model corresponding to the command (step S26) and notifies the definition information creating module 26 that the model has been defined (at step S25). Thus, the process is completed.

Figure 15:
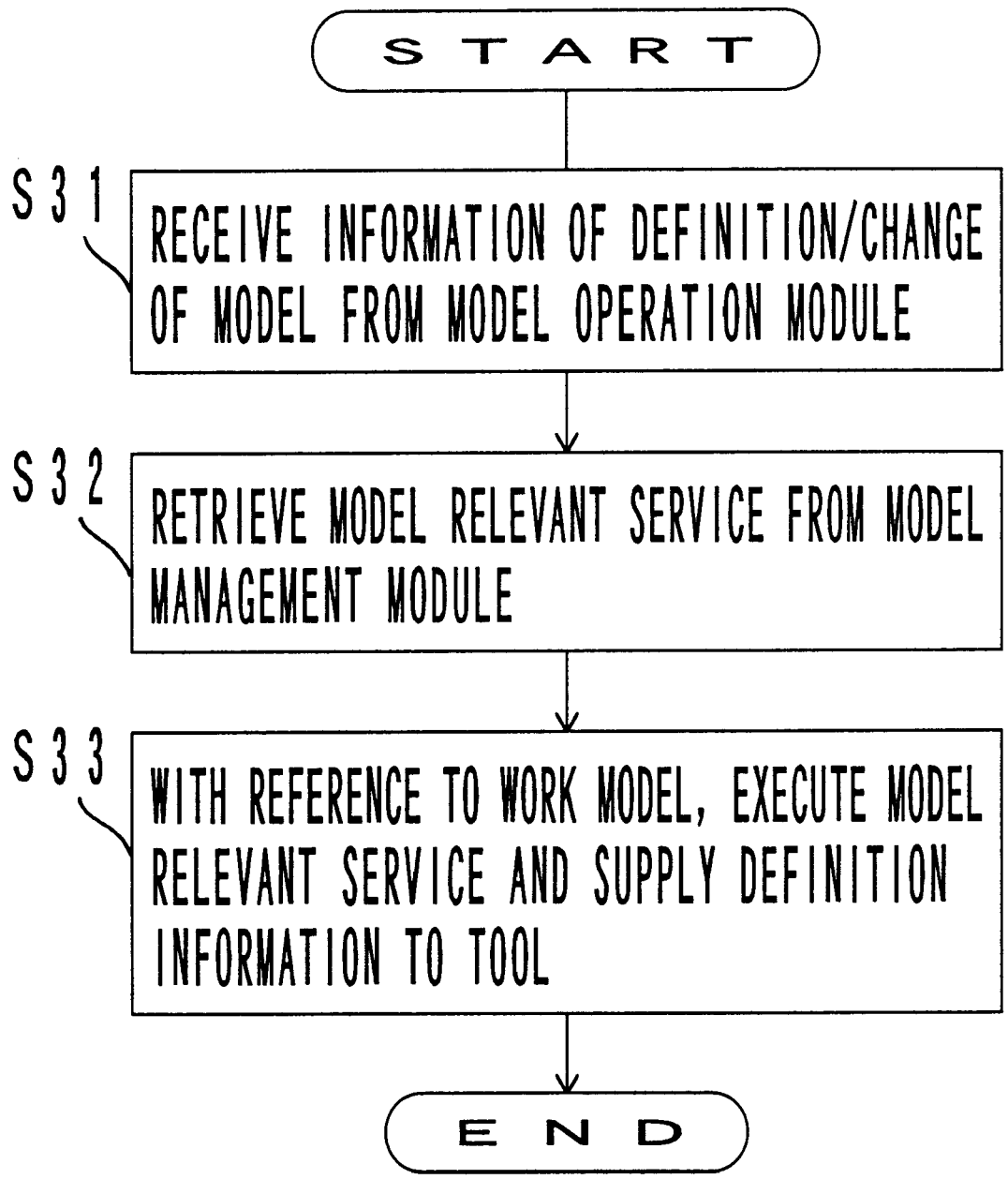
FIG. 15 is a flow chart showing the process of a definition information creation module.

FIG. 15 is a flowchart of the process of the definition information creating module 26. When the process of the definition information creating module 26 is started in FIG. 15, the definition information creating module 26 receives information of definition/change of a model from the model operating module 24 (at step S31).

Thereafter, the definition information creating module 26 retrieves a service model 35 corresponding to the model from the model management module 27 (at step S32), when necessary references the job model 31, and executes the service corresponding to the model (at step S33). Thereafter, the definition information creating module 26 creates the definition information 36 and supplies it to the tool. Thus, the process of the definition information creating module 26 is completed.

The model relevant service is a service of which definition information 36 of a relevant tool is automatically created corresponding to definition/change of a model and the definition information 36 is applied to the tool. An example of such a model relevant service is as follows.

Service 2

When a sub-work SW is appended to a work W, for example, a command "add-newtask (SW, W)" that commands to append to a sub-work, is sent to the work flow tool 28.

This command causes the new sub-work SW to be appended to the work W managed by the work flow tool 28. This command is equivalent to the definition information 36 of the work flow tool 28.

With the model relevant service, when a job model 31 is defined, the definition information creating module 26 can automatically create definition information 36. At this point, the definition information creating module 26 retrieves information necessary for activating/controlling each tool from the job model 31 and creates the definition information 36.

For example, in the work model 34 shown in FIG. 6, the link "consist-of" defines that the "DEVELOPMENT WORK" consists of four sub-works. The link "next to" defines the execution order of these sub-works.

The definition information creating module 26 automatically creates information necessary for using the work flow tool 28 corresponding to these relations and supplies the information to the work flow tool 28. However, the user of the system does not necessarily know the data structure of the definition information 36 of the work flow tool 28.

This applies to the case that the job model 31 is changed. For example, when a new sub-work is appended, the information of the work flow tool 28 is automatically changed. When a tool that is used is changed, only the definition information creating module 26 is changed, not the job model 31.

Thus, the user of the system does not consider what tool is used. And the user can correspond flexibly to company activities by managing the job model 31 and the service model 35.

For example, the Task object 69, the DesignTask object 70, and so forth in the class level include work procedures. The tool control module 25 or the definition information creating module 26 can create a definition file for a work procedure that the work flow tool 28 requires, corresponding to this procedures. The module 25 or 26 supplies the definition file as the definition information 36 to the work flow tool 28 and controls it.

To operate the document management tool 29, a relation table that defines the relation among documents is required as definition information 36. Thus, the tool control module 25 or the definition information creating module 26 creates the relation table corresponding to the definitions of objects in the class level such as the Document object 65 and the DesignDoc object 66. Information of objects in the instance level are stored corresponding to the relation table and the document management tool 29.

Since required information depends on each tool, a different definition information 36 is created for each tool.

In addition, with the organization model 32, definition information 36 of a tool suitable for the organization to which the user belongs can be created. For example, when the work flow tool 28 is used, workers should be assigned to individual sub-works. However, in the system according to the present invention, suitable workers can be selected from organizations to which they belong and automatically assigned. This function is accomplished by the following service.

Service 3

When a user A commands the system to execute a work W, the system retrieves individual sub-works SW from the work W through a link "consist-of". Next, the system retrieves a role R from the individual sub-works SW through a link "role". Next, the system retrieves a researcher B with the role R from the organization to which the user A belongs. Thereafter, the tool control module 25 causes the work tool module 28 to assign the sub-work SW to the researcher B.

When the service executing module 23 executes this service, the tool control module 25 sends, for example, a command "set-role (SW, B)" as definition information 36 to the work flow tool 28. This command causes the researcher B to be assigned as a worker of the sub-work SW managed by the work flow tool 28.

For example, in the case of the sub-work "DEVELOPMENT" shown in FIG. 6, the role "PROGRAMMER" is retrieved through the link "role". Now, assume that as instances of "PROGRAMMER" there are three worker's names AAA, BBB, and CCC. In addition, assume that there are five worker's names BBB, DDD, EEE, FFF, and GGG in an organization "PROJECT 1" to which the user A belongs. At this point, the worker BBB who is a "PROGRAMMER" and belongs to the "PROJECT 1" is assigned as a worker of the sub-work "DEVELOPMENT".

Next, with reference to FIGS. 16 to 21, an example of changing a job model 31 will be described.

Figure 16:
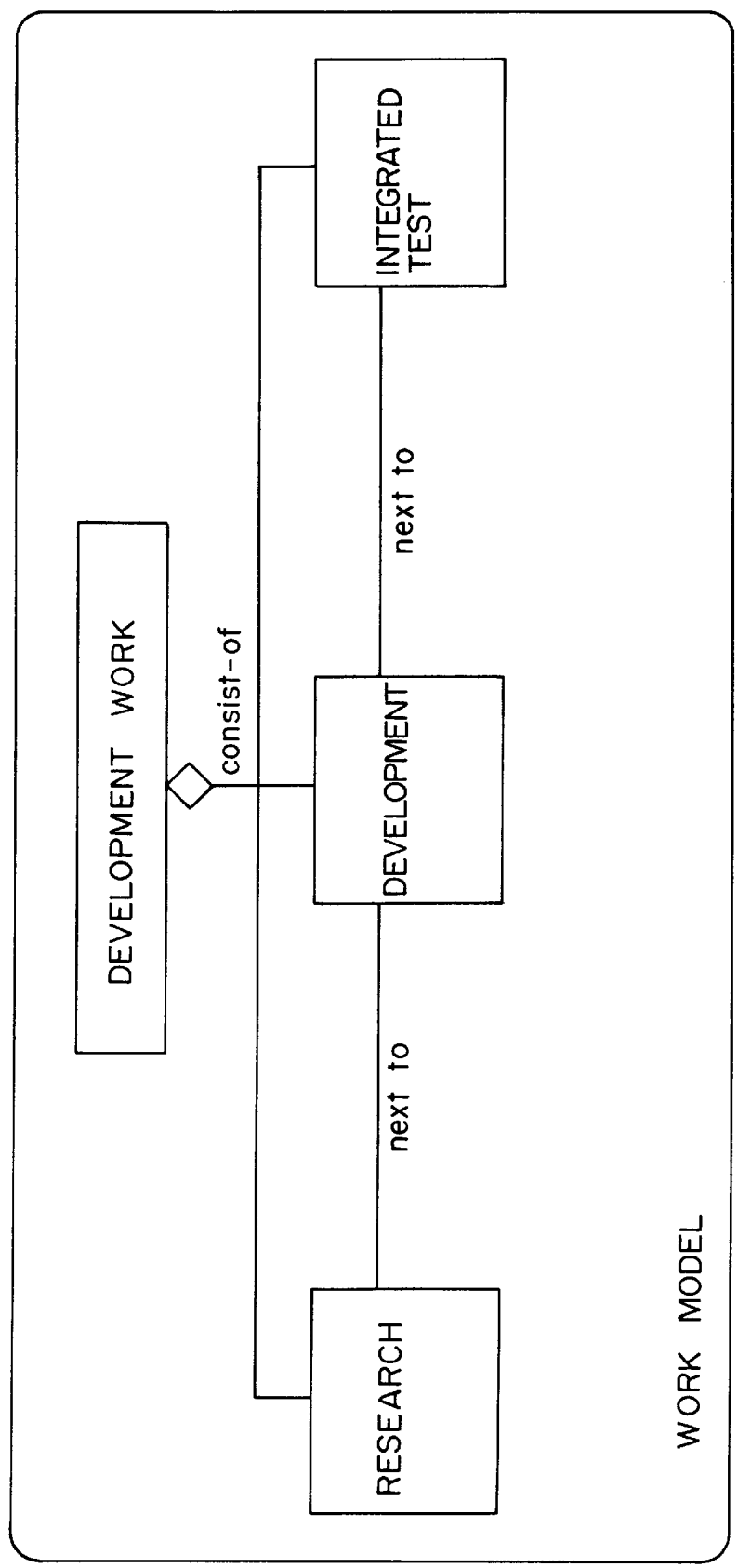
FIG. 16 is a schematic diagram showing a work model on a display screen before a work model is changed.
Figure 17:
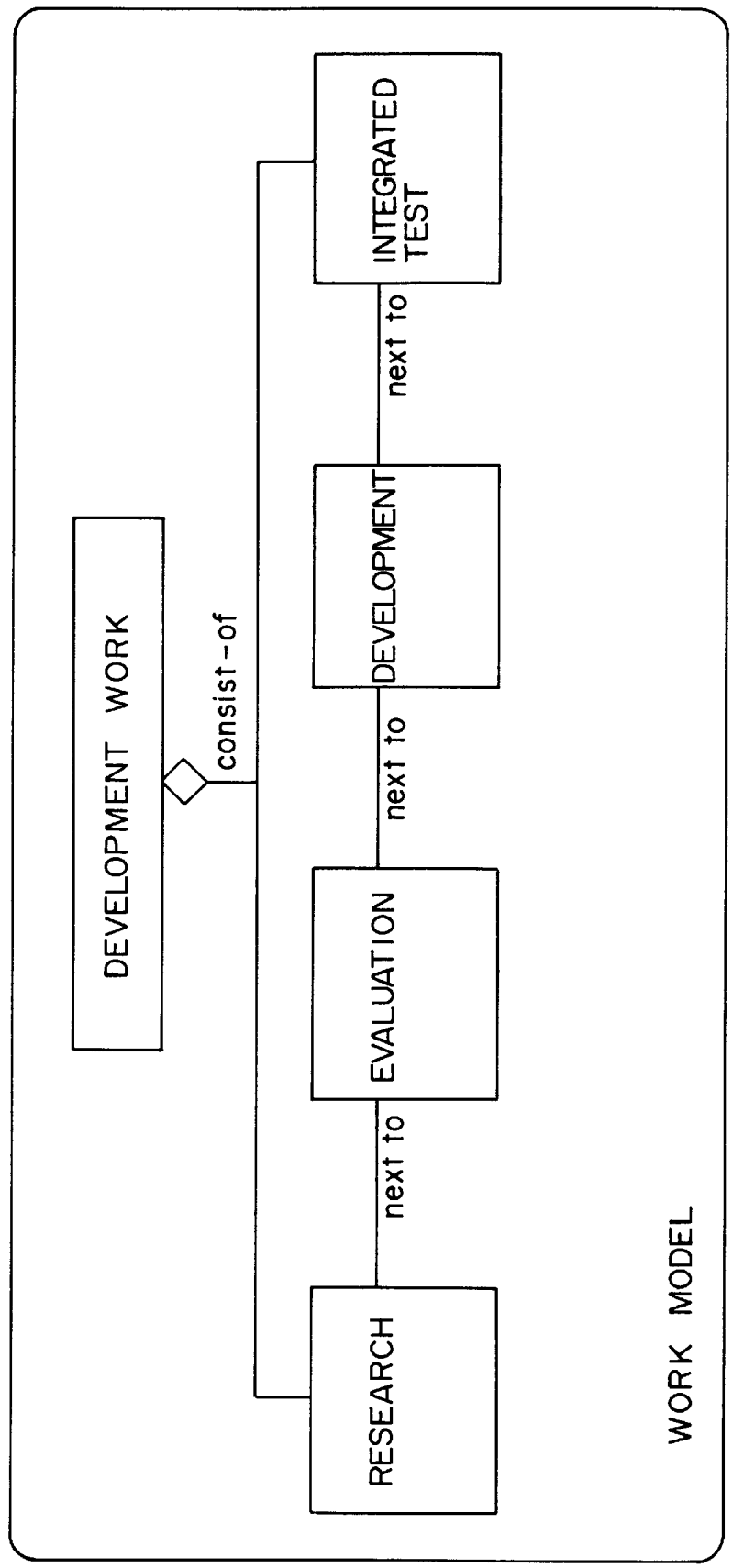
FIG. 17 is a schematic diagram showing a work model on the display screen after the work model is changed.

FIG. 16 shows a work model 34 on a display screen before the work model 34 is changed. In the work model 34 shown in FIG. 16, a "DEVELOPMENT WORK" consists of three sub-works "RESEARCH", "DEVELOPMENT", and "INTEGRATED TEST". When a new sub-work "EVALUATION" is appended between the sub-works "RESEARCH" and "DEVELOPMENT", the work model 34 is changed as shown in FIG. 17.

At this point, before the work model 34 is changed, the object table and the link table that represent the work model 34 are as shown in FIG. 18. On the other hand, after the work model 34 is changed, the object table and the link table are as shown in FIG. 19.

In FIG. 18, the object table has four objects "DEVELOPMENT WORK", "RESEARCH", "DEVELOPMENT", and "INTEGRATED TEST" along with their dates of creation. These four objects were created in April. The link table is entried links that represent the relations of these objects as object, and is described object names linked from and to and dates of creation thereof.

For example, a first link "consist-of" in the link table is a link for correlating the "DEVELOPMENT WORK" with the "RESEARCH". A fourth link "next to" is a link for correlating the "RESEARCH" with the "DEVELOPMENT". The date of creation of these links is April that is the same as the date of creation of these objects.

On the other hand, in the object table shown in FIG. 19, the date of creation of the new object "EVALUATION" is May. Moreover, in the link table, the date of creation of each of three new links "consist-of", "next to", and "next to" is May. These links define the relation between the object "EVALUATION" and other existing objects.

In addition, since the sub-work "EVALUATION" was inserted between the "RESEARCH" and "DEVELOPMENT", the link "next to" that correlates the "RESEARCH" with the "DEVELOPMENT" was deleted in May.

When the update history of the job model 31 is managed with the object table and the link table, the structure of the job model 31 at any past point can be provided to the user.

Figure 20:
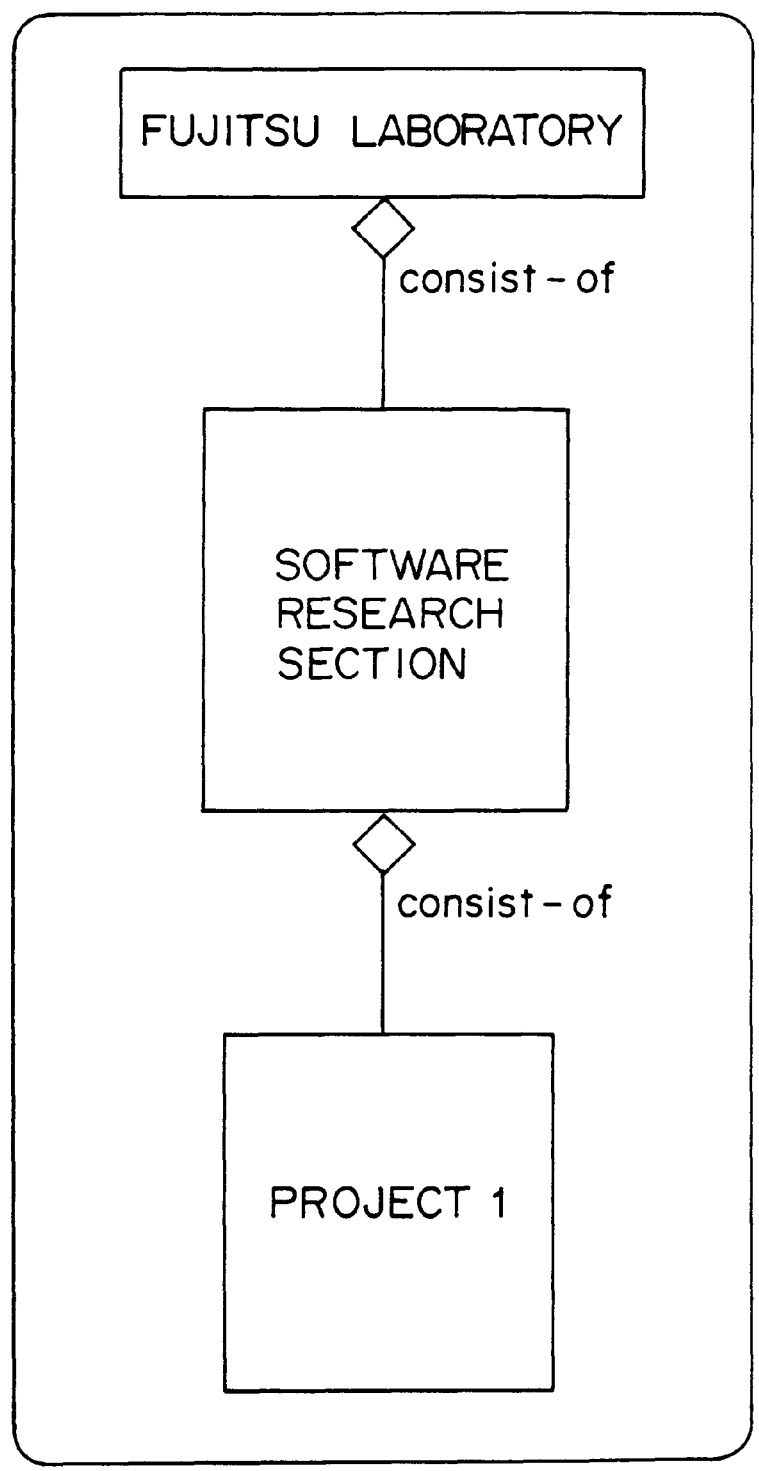
FIG. 20 is a schematic diagram showing an organization model on a display screen before it is changed.
Figure 21:
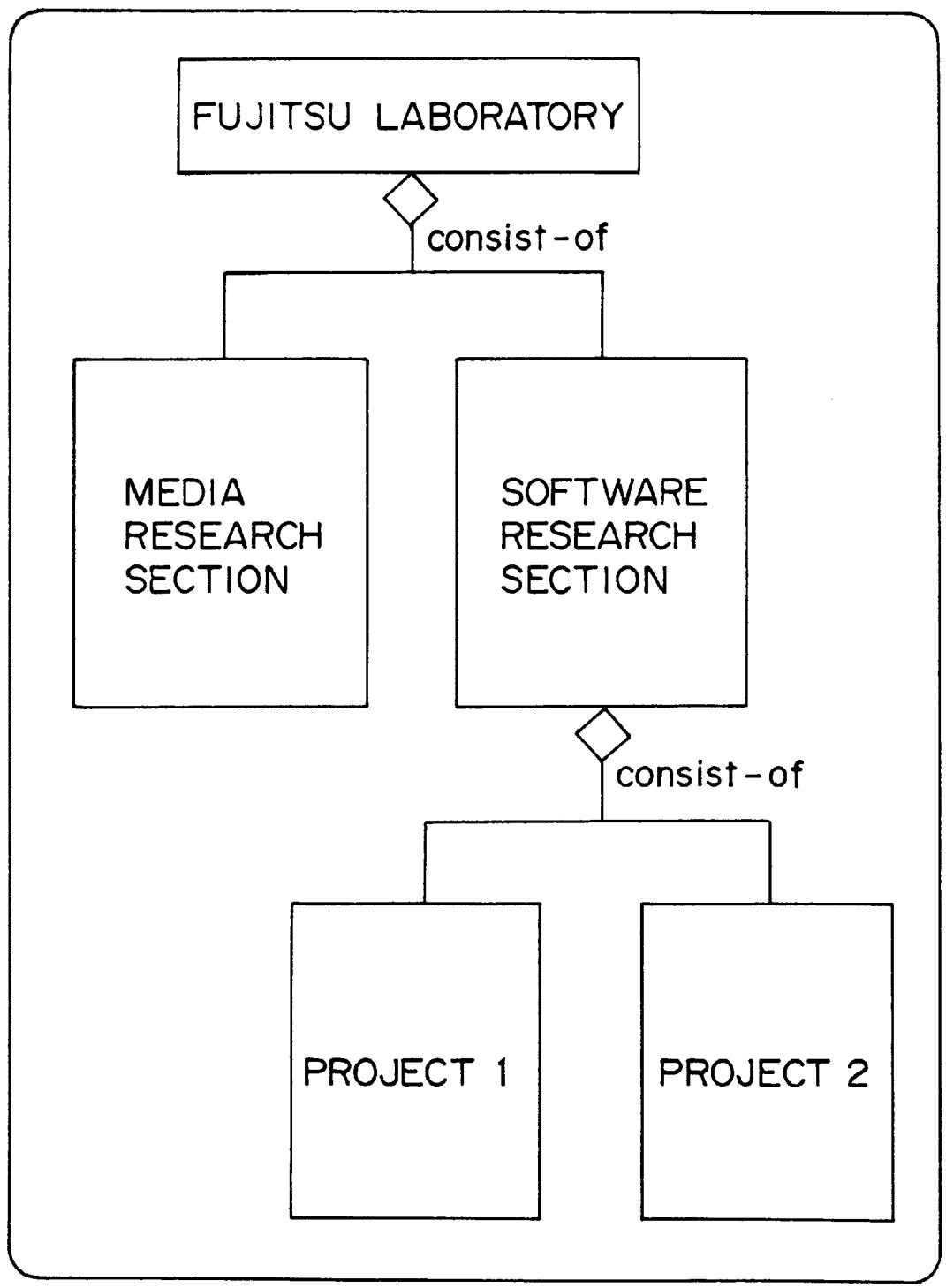
FIG. 21 is a schematic diagram showing an organization model on the display screen after it is changed.

Likewise, FIG. 20 shows an organization model 32 on a display screen before the organization model 32 is changed. FIG. 21 shows the organization model 32 on the display screen after the organization model 32 is changed. In FIG. 21, a "MEDIA RESEARCH SECTION" and a "PROJECT 2" are appended as new organizations. Thus, the object table and the link table of the organization model 32 are updated as with the case shown in FIG. 19.

Likewise, the update history of the service model 35 can be managed. The user can change a model by commanding on the display screen through the GUI 121. And the user can define a new model on the same display screen.

When the job model 31 in the class level is changed, a new object in the instance level is created corresponding to a changed object in the class level. The new object in the instance level and other objects in the instance level that have already exsited before the change can be correlated in the following two methods.

(Method 1) A new object is prohibited from being correlated with existing objects.

(Method 2) A new object is correlated with other objects corresponding to a model in the class level that has not been changed.

When an instance is created, it is correlated with objects in the class level. Thus, it can be determined whether or not the instance has been changed.

When an object in the instance level is erased, link information for correlating an object in the class level correlated therewith and other objects in the instance level are erased. When only the content of an object in the instance level is updated, the link information is kept as it is.

As described above, unlike with a conventional system that is structured with software tools, according to the job supporting system of the present invention, required necessary tools and resources such as documents can be automatically evoked corresponding to a model of a job or a service. Thus, the user can perform his/her job without the need to consider tools and resources.

In addition, unlike with the conventional system in that struct the system by defining necessary information discretely and directly, in the system according to the present invention, information necessary for a tool is indirectly created with information defined in a model, so as to control the tool. In this system, the same information about organizations, works, and/or documents is shared with the same tool or different tools, thereby maintaining the consistency of the information.

In addition, since tools are attached to services in a standardized manner, it is not necessary to individually program tools. Thus, the system according to the present invention can remarkably contribute to decreasing the cost of the system.

In the above-described embodiment, the job model 31 and the service model 35 are structured with objects. However, the present invention is not limited to such a model structuring method. Instead, any data structure can be used. An organization to which the job model 31 is applied is not limited to a commercial organization such as a company. Instead, the job supporting system according to the present invention can be applied to a non-commercial organization such as a volunteer organization.

In addition, a program that performs the process of the above-described job supporting system can be stored in a storage medium for use with a computer system. In this case, any type of storage medium, such as ROM (Read Only Memory), RAM (Random Access Memory), memory card, floppy-disk, optical disk, magneto-optic disk, or etc., can be used.

According to the present invention, organizations, documents, work procedures, and services that are frequently changed corresponding to the contents of jobs can be independently defined as models. Thus, these model portions can be independently and easily changed. In addition, tools and resources can be automatically activated and they can be used. The user can perform his/her job without the need to consider the presence of the tools and resources.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A job supporting system, comprising:
   job model storing means for storing a job model that represents a job of a user;
   service model storing means for storing a service model, defined independently of the job model, that represents a support service, which is independent from the job of the user and provided to the user, with a rule having a condition correlated to the job model; and
   service means for automatically referencing the job model and providing the user with the support service corresponding to the rule represented in the service model, upon satisfaction of the condition in the rule.

2. The job supporting system as set forth in claim 1, wherein
   said job model storing means stores the job model that includes at least one of an organization model that represents an organization structure, a document model that represents a document structure, and a work model that represents a work procedure.

3. The job supporting system as set forth in claim 1, wherein
   said job model storing means stores the job model that includes an organization model that represents members and organizations to which the members belong, and said service means provides services corresponding to the members and the organizations.

4. The job supporting system as set forth in claim 1, wherein said job model storing means stores the job model that includes an organization model that represents an organization structure, a document model that represents a document structure, and a work model that represents a work procedure; the organization model, the document model, the work model being correlated with each other, and said service means obtains information through the relation among the organization model, the document model, and the work model and provides the service corresponding to the obtained information.

5. The job supporting system as set forth in claim 4, wherein when the content of one of an organization, a document, or a work is changed, said service means retrieves a member corresponding to the change by using the job model and notifies the member that the content was changed.

6. The job supporting system as set forth in claim 1, wherein said job model storing means stores the job model that includes an organization model that represents an organization structure and a document model that represents a document structure, and said service means retrieves a member corresponding to a document newly created, by using the job model, and notifies the member that the document was created.

7. The job supporting system as set forth in claim 1, wherein said job model storing means stores the job model that includes an organization model that represents an organization structure and a document model that represents a document structure, and said service means retrieves a member corresponding to an updated document, by using the job model, and notifies the member that the document was updated.

8. The job supporting system as set forth in claim 1, wherein said job model storing means stores the job model that includes an organization model that represents an organization structure, a document model that represents a document structure, and a work model that represents a work procedure, and said service means retrieves a member corresponding to a document that may be updated corresponding to a started work, by using the job model, and notifies the member that the document may be updated.

9. The job supporting system as set forth in claim 1, further comprising:

model operation means for changing at least one of the job model and the service model.

10. The job supporting system as set forth in claim 1, further comprising:

graphics user interface means for displaying the content of at least one of the job model and the service model, wherein the user can define/change at least one of the job model and the service model through said graphics user interface means.

11. The job supporting system as set forth in claim 1, wherein said service means includes definition information creating means for referencing the job model, creating definition information necessary for operating a software tool, and supplying the definition information to the software tool.

12. The job supporting system as set forth in claim 1, wherein said service means includes tool controlling means for referencing the job model, creating definition information necessary for operating a software tool, supplying the definition information to the software tool, and activating the software tool.

13. The job supporting system as set forth in claim 1, further comprising:

history storing means for storing an update history of at least one of the job model and the service model.

14. A job supporting system, comprising:

job model storing means for storing a job model, defined independently of a service model representing a service provided to the user, which represents a job of a user; and tool controlling means for referencing the job model, creating definition information necessary for operating a software tool, supplying the definition information to the software tool, and activating the software tool, when a service request is received from the user.

15. A job supporting system, comprising:

job model storing means for storing a job model, defined independently of a service model representing a service provided to the user, which represents a job of a user; and definition information creating means for creating definition information necessary for operating a software tool and supplying the definition information to the software tool when the job model is changed.

16. A computer-readable storage medium used to direct a computer to perform the functions of:

creating a job model that represents a job of a user;

creating a service model, defined independently of said job model, which represents a support service independent from the job of the user and provided to the user with a rule having a condition correlated to the job model; and automatically referencing the job model and providing the user the support service corresponding to the rule represented in the service model upon satisfaction of the condition in the rule.

17. The storage medium as set forth in claim 16, for use in directing the computer wherein the job model includes at least one of an organization model that represents an organization structure, a document model that represents a document structure, and a work model that represents a work procedure.

18. The storage medium as set forth in claim 17, for use in directing the computer to further preform the function of:

the organization model, the document model, and the work model are correlated with each other; obtaining required information through the relation among the organization model, the document model, and the work model, and providing the service corresponding to the required information.

19. A computer-readable storage medium used to direct a computer to perform the functions of:

creating a job model, defined independently of a service model representing a service provided to the user, which represents a job of a user; and referencing the job model, creating definition information necessary for operating a software tool, supplying the definition information to the software tool, and activating the software tool, when a service request is received from the user.

20. A computer-readable storage medium used to direct a computer to perform the functions of:

creating a job model, defined independently of a service model representing a service provided to the user, which represents a job of a user; and creating definition information necessary for operating a software tool and supplying the definition information to the software tool when the job model is changed.

21. A job supporting method, comprising:

creating a job model, which represents a job of a user;

creating a service model independent of the job model that represents a support service independent from the job of the user provided to the user with a rule having a condition correlated to the job model;

automatically referencing the job model and providing the user the support service corresponding to the rule represented in the service model upon satisfaction of the condition in the rule.

22. The job supporting method as set forth in claim 21, wherein the job model includes at least one of an organization model that represents an organization structure, a document model that represents a document structure, and a work model that represents a work procedure.

23. The job supporting method as set forth in claim 22, wherein the organization model, the document model, and the work model are correlated with each other; obtaining required information through the relation among the organization model, the document model, and the work model, and providing the service corresponding to the required information.

24. A job supporting method, comprising the steps of:

creating a job model, defined independently of a service model representing a service provided to the user, which represents a job of a user;

referencing the job model and creating definition information necessary for operating a software tool when a service request is received from the user; and supplying the definition information to the software tool and activating the software tool.

25. A job supporting method, comprising the steps of:

creating a job model, defined independently of a service model representing a service provided to the user which represents a job of a user;

creating definition information necessary for operating a software tool corresponding to the job model when the job is changed; and supplying the definition information to the software tool.

26. A job supporting system, comprising:

a job model storing unit storing a job model representing a job of a user;

a service model storing unit independent of the job model storing unit and storing a service model defining a support service independent from the job of the user as a condition correlated to the job model so that a change in the job model corresponding to the condition automatically satisfies the condition; and a service unit automatically referencing the job model upon satisfaction of the condition and providing the user the support service.

* * * * *

UNITED STATES PATENT AND TRADEMARK OFFICE
CERTIFICATE OF CORRECTION

PATENT NO.: 6,141,665
DATED : October 31, 2000
INVENTOR(S): Hirotaka HARA, et al.

It is certified that [an/error[s]] appears in the above-identified patent and that said Letters Patent is hereby corrected as shown below:

ON THE TITLE PAGE
[56] References Cited

Change "5,675,745" to --5,567,745--.

Col. 20, line 14, after "user" insert --,--.

Signed and Sealed this

Eighth Day of May, 2001

Attest:

NICHOLAS P. GODICI

Attesting Officer      Acting Director of the United States Patent and Trademark Office